(12) United States Patent
Terry

(10) Patent No.: US 7,095,718 B1
(45) Date of Patent: Aug. 22, 2006

(54) CLIENT/SERVER SCAN SOFTWARE ARCHITECTURE

(75) Inventor: Steven W. Terry, Irving, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/563,005

(22) Filed: Apr. 29, 2000

(51) Int. Cl.
*G01R 31/08* (2006.01)

(52) U.S. Cl. ........................... 370/241; 714/724

(58) Field of Classification Search ........... 370/351, 370/352, 465, 467, 241, 385; 709/203, 219; 455/67.11
See application file for complete search history.

(56) References Cited

U.S. PATENT DOCUMENTS

| | | | | |
|---|---|---|---|---|
| 5,371,883 A * | 12/1994 | Gross et al. | ........... | 395/575 |
| 5,809,036 A * | 9/1998 | Champlin | ........... | 371/22.31 |
| 5,841,792 A * | 11/1998 | Kawano et al. | ........... | 714/733 |
| 5,854,889 A * | 12/1998 | Liese et al. | ........... | 395/183.19 |
| 5,913,022 A * | 6/1999 | Tinaztepe et al. | ........... | 395/183.01 |
| 6,189,128 B1 * | 2/2001 | Asaka | ........... | 716/4 |
| 6,243,665 B1 * | 6/2001 | Nagoya et al. | ........... | 703/20 |
| 6,243,832 B1 * | 6/2001 | Eckes et al. | ........... | 714/33 |
| 6,263,373 B1 * | 7/2001 | Cromer et al. | ........... | 709/250 |
| 6,389,565 B1 * | 5/2002 | Ryan et al. | ........... | 714/724 |
| 6,393,591 B1 * | 5/2002 | Jenkins et al. | ........... | 714/725 |
| 6,578,167 B1 * | 6/2003 | Boorom et al. | ........... | 714/727 |
| 6,587,879 B1 * | 7/2003 | Reynolds | ........... | 709/224 |
| 7,017,081 B1 * | 3/2006 | Gomez | ........... | 714/30 |

OTHER PUBLICATIONS

Bouchier, Paul, et al., "A Service Processor with Algorithms for Supporting a Multipartition Computer," U.S. Appl. No. 09/561,812, filed Apr. 29, 2000.
Reasor, Jason, "Manipulation of Hardware Control Status Registers via Boundary Scan," U.S. Appl. No. 09/563,001, filed Apr. 29, 2000.

\* cited by examiner

*Primary Examiner*—Doris H. To
*Assistant Examiner*—Steven A Blount

(57) ABSTRACT

The inventive interface connects a client system with the server computer. The server computer includes the JTAG scan program, and can issue scan tests to the desired device under test. Thus, the user can remotely operate the JTAG tool, and can use the unix shell or scripting language of their client system, to issue scan commands. The interface converts commands from the client system into commands that the JTAG application can recognize. The interface converts the responses from the device under test into a format that can be delivered to the client computer. The interface uses TCP/IP protocol for communications between server and client processes.

17 Claims, 2 Drawing Sheets

CLIENT TCP/IP PACKET DATA

HEADER
401 — packetType
402 — packetLen
403 — headerType
404 — hostType
405 — hostNameLen
406 — hostName
407 — responsePort CONTROL
408 — ctrlType
409 — id
410 — priority
411 — start
412 — end
413 — returnCode
414 — status
415 — response DATA
416 — dataType
417 — dataStrType
418 — dataStrLen
419 — dataStr

CLIENT/SERVER SCAN SOFTWARE ARCHITECTURE

RELATED APPLICATIONS

The present application is related to U.S. patent application Ser. No. 09/563,001, filed Apr. 29, 2000, entitled "MANIPULATION OF HARDWARE CONTROL STATUS REGISTERS VIA BOUNDARY SCAN," and U.S. patent application Ser. No. 09/561,812, filed Apr. 29, 2000, entitled "A SERVICE PROCESSOR WITH ALGORITHMS FOR SUPPORTING A MULTIPARTITION COMPUTER," the disclosures of which are hereby incorporated herein by reference.

TECHNICAL FIELD

This application is related in general to multi-processor computer systems, and in specific to an arrangement for scan based testing of the multi-processor computer systems.

BACKGROUND

Scan based testing is also referred to as JTAG, which is the joint test action group that developed the standard IEEE standard 1149.1, which is hereby incorporated by reference. This testing involves a serial shift register methodology for performing tests and diagnostics of a digital system. Data, sent via JTAG test application, is pushed into the system's registers. The data is then shifted through the desired device to be tested, and the results are sent back to the JTAG application. For example, the test may be to merely determine whether a test pattern moves through the device without change. The results are compared against expected results, and any mismatch indicates a diagnostic failure.

In the prior art, scan testing is performed by a running a JTAG application on a computer that is connected to the unit under test (UUT). Thus, a user is limited to working with whatever graphical user interface or command prompt format the JTAG application uses to operate.

Working with different scan tools presented problems. For example, users would have to learn different command sets or have situations requiring the stopping and restarting of different tools to perform certain experiments.

SUMMARY OF THE INVENTION

These and other objects, features and technical advantages are achieved by a system and method which uses an interface that connects a client system with the server computer. The server computer includes the JTAG scan program or JTAG utilities and scan tests (JUST) program, and can issue tests to the desired UUT. The user can then operate outside of the JTAG application and can instead execute JTAG commands via a client interface running inside their environment, e.g. a unix shell or a user written script. The client interface in effect translates a user request into a command JTAG application can recognize and execute without forcing a person to use a specific user interface (such as typing in commands by hand at a command prompt). The JTAG application is now turned into a constantly running server waiting on commands, typed in or sent from the client tool. Since the JTAG application is located on the server computer, it does not have to be started and terminated, as it may be constantly running.

Thus, the inventive interface allows a user to run their own unix shell to perform scan testing functions or experiments. Also, the user can draft a script or program that performs scan testing or experiments. User developing such test programs can combine test functions. For example, a script could be written that is used to check hardware between the other non-scan related command, e.g. margin power or clocks.

The JTAG application looks for a particular argument, e.g. daemon argument. If seen, the application will begin listening for data in a particular port. Client functions that represent scan tool commands are provided as programs. When executed, the programs seek out the JTAG server and send the commands to the server. The server transfers data, e.g. display data, back to the client process. The communications between the client and the server are handled via protocol for scan command and response packets built on top on TCP/IP packets.

Therefore it is a technical advantage of the present invention to have an interface between a client computer and a JTAG scan server to allow for a user to operate the scan server via the client process.

It is another technical advantage of the present invention to allow a user to perform scan testing from the environment of their choice. Inside JTAG applications, there are a number of scan functions, many of which cover the tasks done in prior solutions by different tools. Now, there is one central point for scan operations, JTAG application with a JTAG client interface. This scheme provides a constant method for dealing with scan, making scan based methods easier to learn an use. This scheme also is flexible in that users can utilize it under their favorite unix environment. The user does not have to learn another format, i.e. the scan test environment. The invention provides a generic solution for sending scan requests to a scan server.

It is a further technical advantage of the present invention to allow a user to combine scan testing commands with other utility and diagnostic functions. The commands and the functions can be tied together via a program or script, e.g. a unix script.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
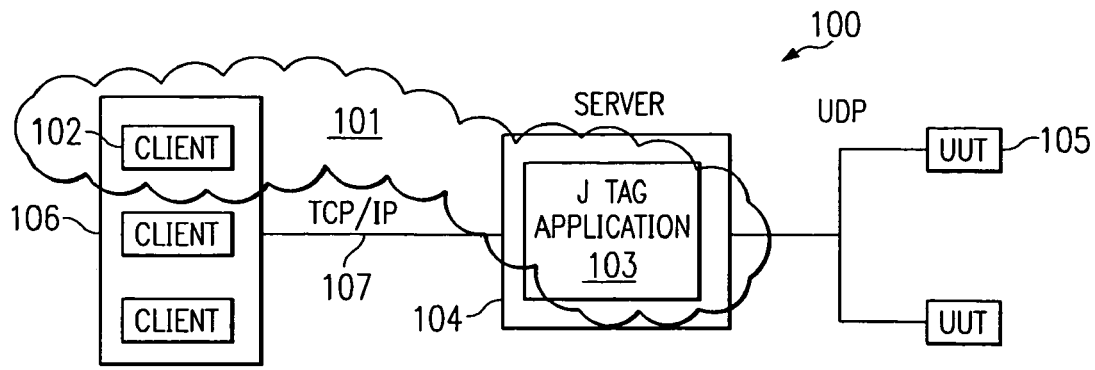
FIG. 1 depicts a block diagram having the inventive interface connect a client process with a JTAG application.

FIG. 1 depicts the inventive interface 101 that is connecting a client process 102 located on a client computer 106 with the JTAG server 103 operating on a computer 104. The JTAG is capable of scan testing the units or devices under test (UUT) 105. The inventive interface 101 is formed from the client process 102 and the JTAG application 103 or scan engine, communicating via TCP/IP protocol 107.

The JTAG scan testing commands are entered in the format of the client computer 106, e.g. unix shell. The inventive interface converts the scan commands into programs or processes, preferably unix programs or processes 102. Thus, scan commands are turned into simple unix programs, run at a unix prompt. Results for the commands from the JTAG application are processed by the client computer 106 and are outputted into a user viewable format, e.g. printed, displayed, or stored as a file. Note that a single computer 106 can have multiple client processes operating simultaneously. Also note that more than one computer 106 can be sending scan commands to JTAG application 103.

The scan engine of JTAG server 103 waits on command requests. Once the requests are received, JTAG application 103 begins testing of the specified UUT(s) 105. Server 104 may be a test station or a portion of a large multiprocessor computer system. The UUTs may be devices connected to the test station or they may be components of the larger multiprocessor computer system. The server 103 maintains a database of the scan fields, and other information for testing the UUTs 105. Note that the client program may be located on the same computer as the JTAG application or it may be located on a remote computer that is connected to the server 104 via LAN, WAN, telephone link, or Internet link connection(s). Thus with the inventive interface, all scan related functions can be operated via the client programs. Consequently, the user does not have to learn about running different scanning tool applications. The user merely works with testing scripts.

The client process may result from a script program assembled by the user. The test script may be written in a variety of languages. Embedded in the program is a call to the inventive interface. The JTAG tool must be started field in daemon mode. The command entered at the unix prompt may look like: $just -daemon -jp 2222. The "-daemon" argument instructs the JTAG server to watch data arriving via a socket connection as well as from standard input. The "-jp 2222" term sets the JTAG port at the value 2222. This is the unix port where any client request will be received by the JTAG application. This -jp value is an option, if not value is provided, the JTAG application will look up a default in a service file. Note that the JTAG application will continue to run and wait for input when it is not processing a command. Any information received at the socket port is processed by the JTAG application.

After placing the JTAG tool in daemon mode, the user may send commands to the JTAG server, either through typing the commands in at a prompt or through a script program (note that the daemon argument may be included in the script program). The client process 102 will turn the commands or the like arguments into a TCP/IP format packet(s) and send that packet(s) to the port for the JTAG application of the server 104. Any response(s) or output from the JTAG server is also turned into TCP/IP format packet(s) and returned to the client process. The client process then provides the information to the user. The client process 102 and the JTAG application will continue to communicate information, mainly output associated with the scan command, until the application reports there is no more data. The client will then quit as its purpose is finished. The server sets up a socket based on the client information it received, so it does not have to do anything in terms of placing client data into the packet. It does place client data into the response packet to make it easier to debug problems.

Figure 2:
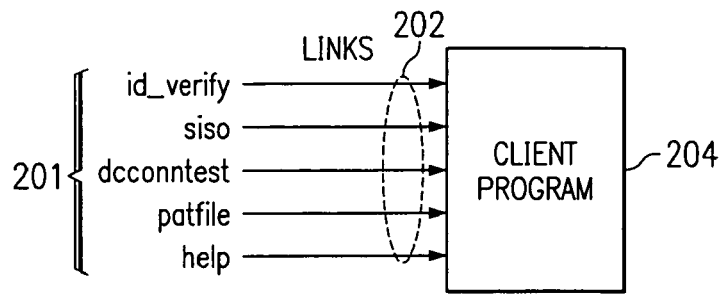
FIG. 2 depicts a block diagram of a plurality of scan commands, each having their own respective link to the client program.

While there is only one client program, there are several JTAG scan related commands. This inconsistency is resolved by the fact that each JTAG scan command is stored as a link to the one client program. When the client program is executed, it places the command line into the packet sent to JTAG application give JTAG the command name and argument list it needs. Inside the client program, the command line it grabs contains not the name of the client program, but the name of the link or JTAG command. To the user, the user is running a program that has the same name and accepts the same arguments as the JTAG command the user wishes to run. Having only one client program allows for easier updates and version control of the program. FIG. 2 depicts a plurality of scan commands 201, each of which have their own respective link 202 to the client program 204. The commands shown here are by way of example only, as other scan commands exist. Id_verify reads JTAG ID's on the UUTs. SISO reads and writes scan rings inside UUTs. Deconntest performs DC connectivity tests on the wires inside a UUT. Pat file applies a file of scan commands and data (a pattern) to devices in the UUT.

The invention operates a commands as follows. For example, consider the "put" command, which is used to load a data value into a scan field. To run the put command in client/server mode, the user will enter the following either via prompt or script program: $ put -jp 2222 myScanField Oxab. This command then uses the link to invoke the client program. The client program works by stripping out the "-jp 2222" term and then sending the rest of the command string (including the command name) to the server. The server will see the message: "Put myScanField Oxab" which is identical to what someone may have entered at the JTAG server prompt. The server processes this command and sends back the results to the client process. The advantage of the mechanism is that if the links were not present, then each command would have separate program. A small change to one program would have to be rippled through all of the programs. Thus, by having the commands link to the client program, then only one program, namely the client program, is needed.

Figure 3:
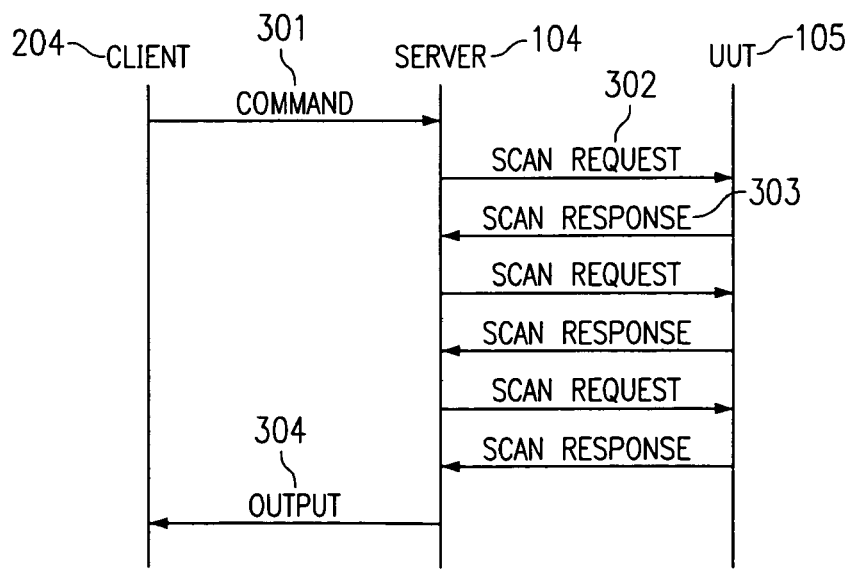
FIG. 3 depicts the sequence of events that occur between the client process, the JTAG application, and the UUT when a command is issued.

FIG. 3 depicts the sequence of events that occur between the client process, the JTAG server and the UUT when a command is issued. The client program 204 operating on client computer 106 sends a command in the format as a TCP/IP packet to the JTAG application on the server 104. The server will then perform the specified tests on the UUT. The server will request scan tests 302 in accordance with the command. The UUT(s) 105 will respond 303 with data or other information. The command may require numerous requests and responses. When the server has received response(s), the server returns the information to the client 204 via a TCP/IP format packet. The server may send out more than one output packet 304 to the client 204. In other words, the server may send output packets based on one or more responses from the UUT(s). A particular command may require more than one output packet. Note that the server to UUT communications, client to JTAG server is TCP/UDP format; they are Internet protocol formats. JTAG server to UUT is UDP.

Figures 4, 5:
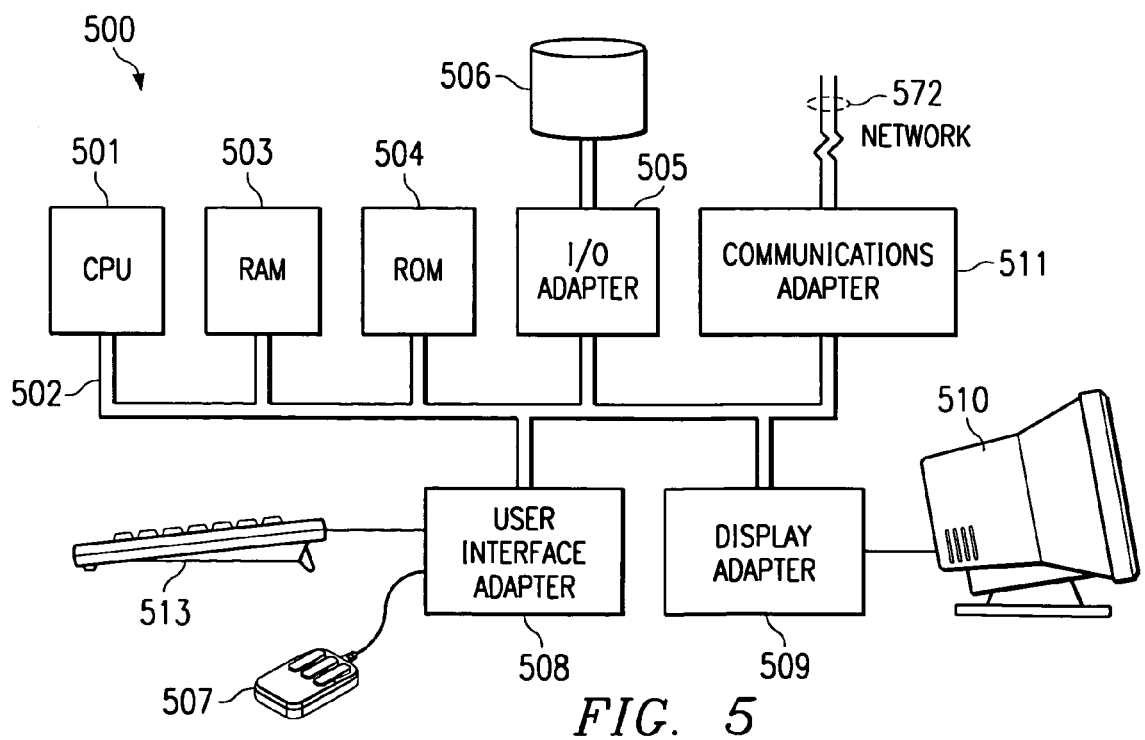
FIG. 4 depicts the TCP/IP packet fields used from communication between the client process and the server.
FIG. 5 depicts a block diagram of a computer system which is adapted to use the present invention.

FIG. 4 depicts the TCP/IP packet fields user from communication between the client process and the server. Data moves between the client and the server via TCP/IP packets. Each packet has three sections, the header, the control and the data section. The packets define who is beginning and ending the communication, and how much data is being transferred. The header section defines the packet type 401 and packet length 402. Packet type allows additional packets to be specified for later use with each packet having different formats. Header type 402 is to be used similar to packet type. Host type 404, host name length 405, and host name 406 are information about the creator of the packet, namely the client computer 106. Response port 407 is the creator's port that the creator will monitor for responses. Note that the destination, e.g. the JTAG port, is specified on the daemon instruction. The default is the same machine, i.e. both the client and the server are the same machine. This instruction creates an Internet protocol socket between the client and the server. Thus, the destination information is already established.

The next section is the control section. This section includes control type 408 which would be used similar to the packet type 401. The Id 409 is used in case of multiple clients operating on the same host. Priority level 410 can be used to indicate the relative importance of the packet with respect to other packets. Start 411 and end 412 are used in multiple packet communications. The start end fields in the command section are used to begin and terminate a communication session between the client and the server. Communication between different systems can be error prone at times (e.g. lost packets), so that two sides use the start and end flags as a form of handshaking. The start helps identify that JTAG application will be processing a new command. When JTAG is finished processing the request, it uses the end flag to tell the client he had received the last of the data and can now safely terminate the session. There is one other handshaking field in the control section, that's the response field 415. For many commands, the client will send a request and the receive a series of responses until terminated with the end flag. However, there may be times when the server needs additional data. For example, the JTAG server may need to ask the user a question and wait for a response. In such a situation, the server will set the response flag to indicate that it will wait for a response to its query. There are two fields related to the status of the operation. The status field 414 is set by the server to indicate how the overall procedure went. It can be loaded with a passing value or some error code. This status is mainly used inside the software and is not normally seen by the user. The return code 413 on the other hand is relayed back to the user in that it is the value returned by the JTAG client process. This return or exit value is determined by the JTAG server and sent back to the client in the return code field. This allows the user or a script to test the status environment variable inside their shell to determine now the JTAG command fared.

The data section includes data type 416 and data string type 417 are to be used similarly to the packet type 401. The data string length 418 indicates how much data will be present in the packet. Thus, data size is not fixed. The data string 419 is the data in the packet. Note that when the client is sending a command to the server the command is placed in the data string. Also note that when the server is sending back the output packet the data from the UUT(s) is placed into the data string.

Note that the packet fields are to be used for bi-directional communications between the client and the server. However, one (or more) field format may be used for communications from the client and one (or more) field format may be used for communications from the server. Note that other fields may be present to handle large, multiprocessor complexes that comprise a plurality of nodes. Such fields would specify the complex and node for the location of the desired UUT.

FIG. 5 illustrates computer system 500 adapted to use the present invention. The system 500 may serve as the client computer 106 and/or the server 104, or both. Central processing unit (CPU) 501 is coupled to system bus 502. The CPU 501 may be any general purpose CPU, such as an HP PA-8500 or Intel Pentium processor. However, the present invention is not restricted by the architecture of CPU 501 as long as CPU 501 supports the inventive operations as described herein. Bus 502 is coupled to random access memory (RAM) 503, which may be SRAM, DRAM, or SDRAM. ROM 504 is also coupled to bus 502, which may be PROM, EPROM, or EEPROM. RAM 503 and ROM 504 hold user and system data and programs as is well known in the art.

The bus 502 is also coupled to input/output (I/O) controller card 505, communications adapter card 511, user interface card 508, and display card 509. The I/O card 505 connects to storage devices 506, such as one or more of hard drive, CD drive, floppy disk drive, tape drive, to the computer system. Communications card 511 is adapted to couple the computer system 500 to a network 512 which may be one or more of local (LAN), wide-area (WAN), Ethernet or Internet network. User interface card 508 couples user input devices, such as keyboard 513 and pointing device 507, to the computer system 500. The display card 509 is driven by CPU 501 to control the display on display device 510.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for scan testing at least one unit, the system comprising:
   a user program that receives a scan command from a user to perform a JTAG scan test on the one unit and formats the scan command into a command packet; and
   a scan program that receives the packet from the user program and performs JTAG scan testing on the one unit according to the command packet;
   wherein the scan program receives response information regarding the JTAG scan testing from the one unit, formats the response information into a response packet, and sends the response packet to the user program.

2. The system of claim 1 wherein:
the command packet and the response packet have TCP/IP formats.

3. The system of claim 2 wherein:
the command packet includes the command in a data string field; and
the response packet includes the response information in a data string field.

4. The system of claim 2 wherein:
the command packet includes information describing the user program to allow the scan program to route the response packet to the user program.

5. The system of claim 1 wherein:
the user program establishes communications with the scan program by sending the scan program an instruction to monitor a specified port for the command.

6. The system of claim 1 wherein:
the user program is resident on a first computer; and
the scan program is resident on a second computer.

7. The system of claim 6 wherein:
the first and second computers are remotely located from each other.

8. A method for scan testing at least one unit, the method comprising the steps of:
receiving, by a user program, a scan command from a user to perform a JTAG scan test on the one unit;
formatting, by the user program, the scan command into a command packet;
delivering the command packet to a scan program;
performing, by the scan program, JTAG scan testing on the one unit according to the command packet;
receiving, by the scan program, response information regarding the JTAG scan testing from the one unit;
formatting, by the scan program, the response information into a response packet; and
sending the response packet to the user program.

9. The method of claim 8 wherein:
the command packet and the response packet have TCP/IP formats.

10. The method of claim 9 wherein the step of formatting, by the user program, the scan command into a command packet comprises the step of:
placing the command in a data string field of the command packet.

11. The method of claim 9 wherein the step of formatting, by the scan program, the response information into a response packet comprises the step of:
placing the response information in a data string field of the response packet.

12. The method of claim 8 further comprising the step of:
establishing, by the user program, communications with the scan program by sending the scan program an instruction to monitor a specified port for the command.

13. The method of claim 8 wherein:
the user program is resident on a first computer; and
the scan program is resident on a second computer.

14. The method of claim 13 wherein:
the first and second computers are remotely located from each other.

15. The method of claim 8 wherein the user program includes a directory of commands, the method further comprising the step of:
linking each command to the user program such that a user of the command calls the user program.

16. The method of claim 8 wherein:
the user program is a unix based program.

17. The method of claim 8 further comprising the steps of:
initiating at least one scan request packet to be sent by the scan program to the one unit; and
sending, by the one unit, at least one scan response packet to the scan program that includes information associated with the command.

* * * * *